United States Patent [19]

Kessler

[11] Patent Number: 4,588,269
[45] Date of Patent: May 13, 1986

[54] APPARATUS WHICH SHAPES GAUSSIAN BEAMS BY SPHERICAL MIRRORS

[75] Inventor: David Kessler, Rochester, N.Y.

[73] Assignee: Eastman Kodak Company, Rochester, N.Y.

[21] Appl. No.: 627,932

[22] Filed: Jul. 5, 1984

[51] Int. Cl.$^4$ .................... G02B 17/06; G02B 5/10
[52] U.S. Cl. ................................................. 350/619
[58] Field of Search ............... 350/614, 618, 6.8, 6.7, 350/6.5, 504; 219/121 LQ, 121 LW; 362/259; 372/99; 128/303.1, 395

[56] References Cited

U.S. PATENT DOCUMENTS

| | | | |
|---|---|---|---|
| 2,941,078 | 6/1960 | Montel | 350/619 |
| 3,669,522 | 6/1972 | Anderson | 350/619 |
| 3,762,794 | 10/1973 | Arnaud | 350/619 |
| 3,782,803 | 1/1974 | Buck | 350/619 |
| 3,957,339 | 5/1976 | Engel | 350/619 |
| 4,099,830 | 7/1978 | Whittle et al. | 350/6.8 |
| 4,239,341 | 12/1980 | Cason, III et al. | 350/294 |
| 4,247,160 | 1/1981 | Brueggeman | 350/6.8 |
| 4,294,538 | 10/1981 | Ban | 355/51 |

FOREIGN PATENT DOCUMENTS

| | | | |
|---|---|---|---|
| 65785 | 12/1982 | European Pat. Off. | 219/121 LQ |
| 150659 | 9/1981 | Fed. Rep. of Germany | 350/619 |
| 81644 | 6/1980 | Japan | 350/619 |

Primary Examiner—Jon W. Henry
Attorney, Agent, or Firm—Raymond L. Owens

[57] ABSTRACT

Apparatus is disclosed which includes a spherical mirror system that anamorphically shapes a gaussian laser light beam such that it can be effectively used in writing and reading systems.

9 Claims, 6 Drawing Figures

APPARATUS WHICH SHAPES GAUSSIAN BEAMS BY SPHERICAL MIRRORS

FIELD OF THE INVENTION

This invention relates to apparatus which anamorphically shapes gaussian laser beams and can be used in laser writing or reading systems.

BACKGROUND OF THE INVENTION

Optical printing systems often use a scanning process. Many of such systems use a laser which produces a circularly symmetrical gaussian beam and a rotating polygon mirror which line scans the laser beam across a photosensitive member at an image zone. The mirrored facets of the polygon when assembled have "tilt errors" commonly referred to as pyramidal errors. These errors may cause unacceptable artifacts in the recorded image. To correct for tilt error, some printers use a cylindrical lens or mirror to optically conjugate the polygon and the image plane in the direction perpendicular to the scan direction. The beam is shaped anamorphically prior to its arrival at the polygon. Examples for such systems are the systems described in U.S. Pat. Nos. 4,040,096 to Starkweather, 4,247,160 to Brueggemann and 4,318,583 to Goshima et al.

Anamorphic shaping of laser beams is also done in optical systems using semiconductor laser diodes. Laser diodes typically produce an initially anamorphic gaussian beam. It is desirable to anamorphically shape that anamorphic beam into a circularly symmetrical gaussian beam. U.S. Pat. No. 3,974,507 sets forth a method for shaping an anamorphic gaussian beam produced by the diode laser into a circularly symmetrical beam using cylindrical lenses. Other examples using cylindrical lenses are set forth in U.S. Pat. Nos. 4,318,594 and 4,253,735. A disadvantage of cylindrical elements such as lenses and mirrors to anamorphically shape gaussian laser beams is that they are difficult to manufacture.

SUMMARY OF THE INVENTION

An object of this invention is to effectively shape gaussian light beams for use in writing or reading systems without using cylindrical beam shaping elements.

This object is achieved in apparatus having a laser for producing a beam of gaussian light by using spherical mirrors properly inclined to produce the desired anamorphic beam shaping.

Another object of this invention is to effect such beam shaping in a manner reducing coma.

Spherical mirrors are easier to manufacture and test using common grinding and polishing methods than cylindrical optics. They can also be made by replication methods. In addition, mirrors are advantageous in output scanning color systems since they do not introduce chromatic aberrations.

DESCRIPTION OF THE PREFERRED EMBODIMENT

As used in the specification the terms anamorphic and astigmatic are interchangeable. They generally refer to the fact that a gaussian light beam is compressed or expanded in one direction.

A mirror with a radius of curvature of R, and tilt angle of I to the surface normal, has, according to the well known Coddington's equations, effective power in the tangential and sagittal directions as follows:

$$Y_t = \frac{2}{R \cos I} \text{ and } Y_s = \frac{2}{R} \cos I.$$

A circularly symmetrical Gaussian beam, with a wavefront curvature of C, will reflect off the tilted mirror as an anamorphic beam with the following wavefront curvatures:

$$C_t = Y_t + C \text{ and } C_s = Y_s + C.$$

Figure 1A:
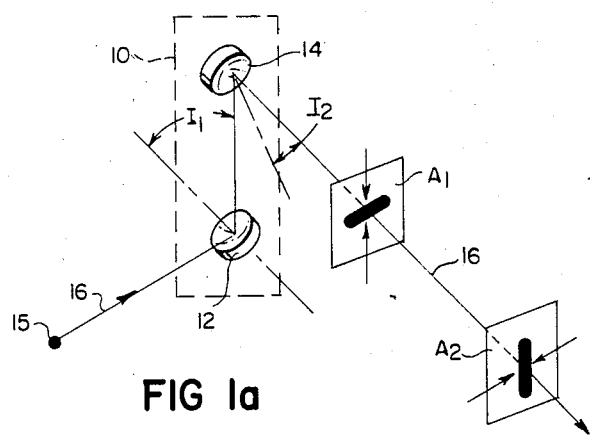
FIG. 1a is a simplified perspective view of a spherical mirror system which receives a circularly symmetrical gaussian beam having a circular waist and shapes the beam to produce an anamorphic beam.

Turning now to FIG. 1a there is shown a mirror system 10 which includes two concave spherical mirrors 12 and 14 which receive and anamorphically shape a gaussian laser light beam 16. The axis of the beam 16 is shown along its operative path through the mirror system 10 and cross-sections of the beam are illustrated at input position 15 and principal planes $A_1$ and $A_2$.

In accordance with the present invention, the mirror system 10 is constructed and located (with respect to the input laser source and an output utilization device) to anamorphically shape the beam 16 so it can be used by a utilization device. This beam shaping is accomplished by having the mirrors 12 and 14 "tilted" with respect to the axis of the light beam 16. That is, the mirrors are located so that the light beam 16 is incident on and reflected from the mirrors 12 and 14 respectively at non-90° angles with respect to the surface normal. The light beam 16 is reflected at angles $I_1$ and $I_2$ (hereinafter referred to as tilt angles) from the mirrors 12 and 14 respectively. Angle $I_1$ is the angle between the axis of the reflected beam 16 from mirror 12 and a normal which extends from the surface of mirror 12 at the point of intersection of beam axis with the mirror surface. Similarly, angle $I_2$ is the angle the axis of the reflected beam 16 makes with a normal extending from a point of engagement with the beam axis at the surface of mirror 14.

More specifically from the position 15 where the gaussian beam 10 has a circularly symmetrical waist, it is projected along an optical path to a position where it is first reflected off spherical mirror 12 onto spherical mirror 14 and then reflected off of mirror 14. The beam 16 is then projected along the optical path through the two principal planes $A_1$ and $A_2$. At the first plane $A_1$, the beam 16 is anamorphic and has a minimum waist in a first principal direction (shown by arrows) and at the second plane $A_2$ it is also anamorphic and has a minimum waist in a second principal direction (shown by arrows) at right angles to the principal direction of the minimum waist at the first plane $A_1$. Thus, in accordance with this embodiment, the mirror system 10 is adapted to anamorphically shape an input circularly symmetric gaussian beam into an anamorphic shape. In one specific example, a mirror system similar to that shown in FIG. 1a was constructed with the radius of the first mirror 12 being 50 mm, and the radius of the second mirror 14 being 75 mm. Both mirrors were positioned so that their tilt angles were 45°. An input circularly symmetrical gaussian beam focused by a lens to have a waist radius of about 0.048 mm was converted to an anamorphic beam at two principal planes $A_1$ and $A_2$. Planes $A_1$ and $A_2$ were separated from each other by 118.9 mm. The minimum waist radius at plane $A_1$ was 0.094 mm and the other minimum waist radius at plane $A_2$ was 0.036 mm. The distance between the input circular waist to the first mirror 12 was 85 mm; the distance between the mirrors 12 and 14 was 93.4 mm and the distance from the mirror 14 to the plane $A_1$ was 87.4 mm. All distances were measured along the light beam axis.

Figure 1B:
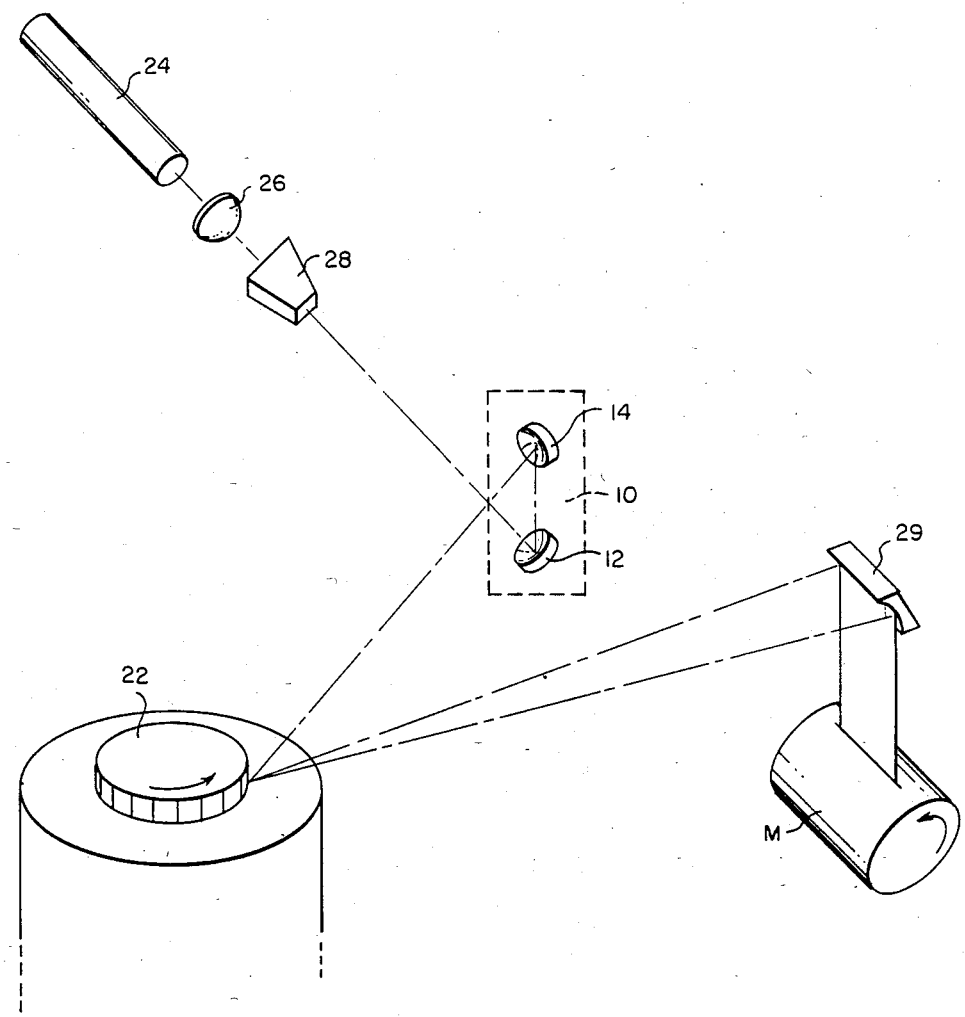
FIG. 1b shows the mirror system of FIG. 1a employed in polygon laser scan printer apparatus.

FIG. 1b, illustrates the use of a spherical mirror system 10 such as shown in FIG. 1a, in a rotating polygon laser scan printer apparatus 20. Apparatus 20 includes a rotating polygon 22 having mirrored facets, a laser 24 which produces a circularly symmetrical gaussian beam of light, a spherical mirror system 10 and a lens 26. The operative rotating facet of polygon 22 is located in the optical path of the beam at or in the vicinity of plane $A_1$ and the image plane M is located at or in the vicinity of plane $A_2$. The lens 26 shapes the laser beam so that it has a circular waist at the light modulator 28. This corresponds to position 15 in FIG. 1a. Mirror system 10 converts the circularly symmetrical beam into an anamorphic beam. The beam spot formed on a polygon facet is relayed and anamorphically shaped by the cylindrical mirror 29 to form a spot of light at the image zone which can be circularly symmetrical or anamorphic. The arrangement is such that any "tilt error" of the polygon facet will affect the waist of the beam (at plane $A_1$) and so will be minimized. The cylindrical mirror 29 has power only in a direction to expand the minimum waist at plane $A_2$). The operation of cylindrical mirrors in polygon laser scan printer apparatus is more fully discussed in U.S. Pat. No. 4,247,160 to Brueggeman. A photosensitive member M in the form of a drum is placed at the image zone and moved in the page scan direction (by means not shown) as the beam is line scanned by polygon 22.

Figure 2:
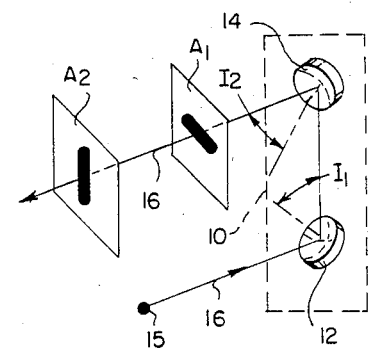
FIGS. 2 and 3 are spherical mirror systems similar to that shown in FIG. 1a but having their spherical mirrors arranged to keep the light beam substantially in a single plane.
Figure 3:
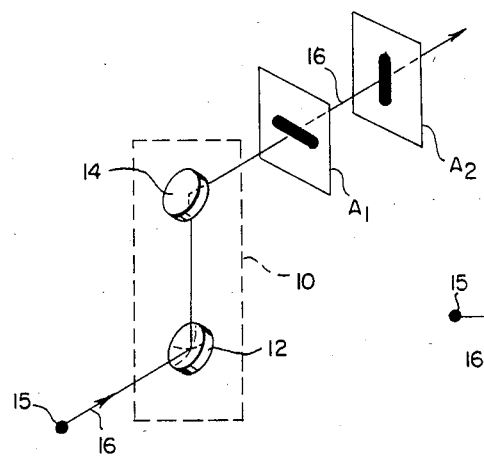

FIGS. 2 and 3 show different embodiments of mirror system 10. In these embodiments two mirrors 12 and 14 with the same tilt angle I are arranged so that the axis of the beam 16 lies in a single plane. Such mirror systems can be advantageously employed in apparatus that have particular space constraints.

Figure 4:
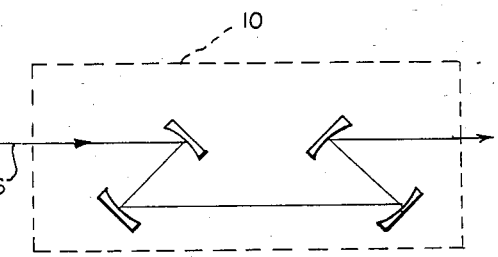
FIG. 4 shows another mirror system which employs four concave spherical mirrors which are arranged to shape a gaussian input beam and produce an output beam free of coma and higher order odd-field aberrations.

The mirror systems of FIGS. 1a, 2 and 3 all produce output beams with undesirable coma. The effect of the coma on the final beam can be judged by the wavefront Root-Mean-Square (RMS) criterion over the elliptical beam. In the above-described example for the embodiment of FIG. 1a, the coma RMS wavefront deformation of the mirrors was calculated to be $1.6 \times 10^{-3}$ and $2.9 \times 10^{-3}$ waves (at a wavelength of $0.633\mu$) and the spherical aberration contributions of the mirrors $1.4 \times 10^{-6}$ and $2.7 \times 10^{-5}$ waves. These small aberrations do not significantly affect the beam quality in this case. However, when smaller F number beams are desired, these aberrations can effect beam quality. Since the desired astigmatism does not depend on the sign of the tilt angle but coma does, it is possible to have a spherical mirror system with four mirrors (two pairs) arranged as shown in FIG. 4 such that for each of the two mirror pairs the desired astigmatism adds up and the coma cancels.

Figure 5:
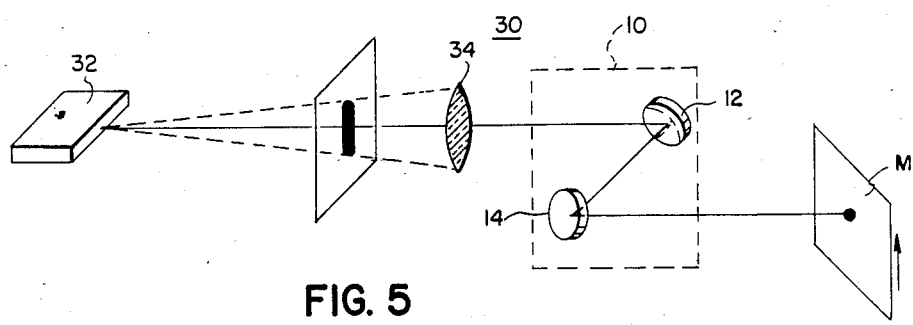
FIG. 5 shows a diode laser which produces an anamorphic gaussian light beam and a spherical mirror system that shapes the beam so that it has a circular cross section at an image zone.

FIG. 5 shows another application for the mirror systems in accordance with the invention, i.e. to anamorphically shape a beam produced by a diode laser 32. The laser produces an initially low F number anamorphic gaussian beam. This beam is converted to higher F number beam by a lens 34 and then anamorphically shaped by any one of the previously described systems 10 to remove the astigmatism to obtain a circularly symmetrical gaussian beam at the image zone where a photosensitive member M is disposed. This embodiment is also highly useful in other systems such as for example shaping a diode laser beam in an optical disk write/read apparatus.

The invention has been described in detail with particular reference to preferred embodiments thereof, but it will be understood that variations and modifications can be effected within the spirit and scope of the invention.

I claim:

1. In apparatus having a laser which produces a gaussian beam of light, the improvement which comprises: optical means having at least four spherical mirrors arranged to eliminate coma which are located in spaced relation along the optical path of the beam and tilted relative to the laser beam so that the light beam is reflected from one mirror to the other and the beam is anamorphically shaped from (i) a circularly symmetrical input gaussian beam to an anamorphic gaussian beam or (ii) an anamorphic input gaussian beam to a circularly symmetrical gaussian beam.

2. The invention as set forth in claim 1, wherein said spherical mirrors are arranged so that the light beam lies substantially in a single plane.

3. In printing or scanning apparatus which employs a diode laser that produces an anamorphic gaussian beam, the improvement which comprises beam shaping means having a mirror system with at least two spaced spherical mirrors which are tilted relative to the anamorphic gaussian beam and arranged so that such beam is reflected from one mirror to the other for changing the shape of the beam so that it is substantially circularly symmetrical at an image zone.

4. The invention as set forth in claim 3, wherein said beam shaping means includes lens disposed between said diode laser and said mirrors for forming an image of the laser beam at the image zone.

5. The invention as set forth in claim 4, wherein the mirrors are arranged so that the beam lies substantially in a single plane.

6. The invention as set forth in claim 5, wherein the mirror system includes four spherical mirrors arranged to substantially eliminate coma.

7. In a laser writing or reading apparatus having a laser which produces a circularly symmetrical beam of gaussian light for use in systems such as printing, and scanning, the improvement which comprises:
    means for forming a circularly symmetrical waist of said light beam;

a mirror system disposed to receive light from the beam waist and having at least two spaced spherical mirrors which are tilted relative to the laser beam such that the beam is reflected from one to the other for anamorphically shaping the beam; and means including a rotating mirror for receiving the anamorphic beam of light from the mirror system and for line scanning such beam across an image zone, and a cylindrical mirror for shaping the beam so that the beam at the image zone is circularly symmetrical.

8. The invention as set forth in claim 7, wherein the mirrors are arranged so that the beam lies substantially in a single plane.

9. The invention as set forth in claim 8, wherein the mirror system includes four spherical mirrors arranged to substantially eliminate coma.

* * * * *